Jan. 5, 1960
W. W. GULLETT
2,920,020
PRODUCING COMPOSITIONS OF MOLTEN SALTS COMPOSED
ESSENTIALLY OF ALKALINOUS METAL CHLORIDES
AND SOLUBLE TITANIUM CHLORIDES
Filed April 10, 1956
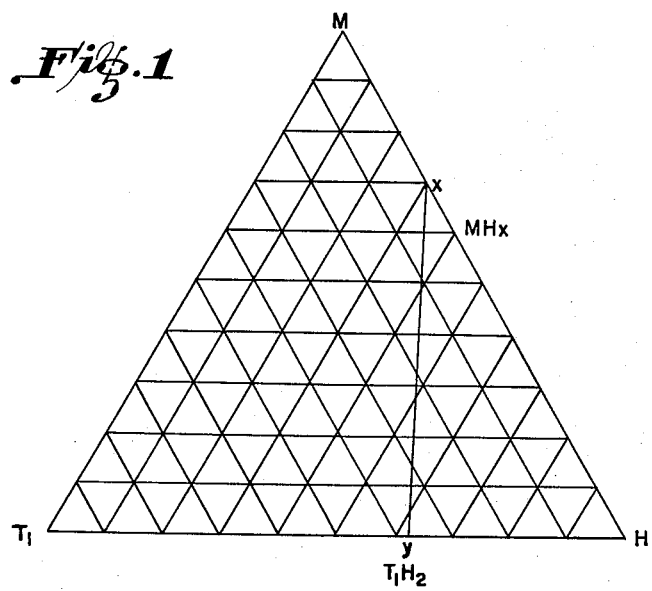
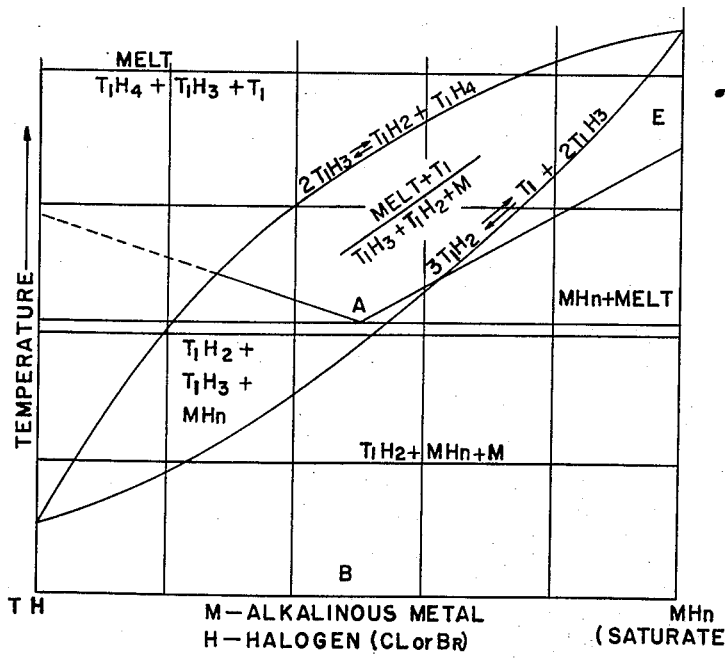
INVENTOR
William W. Gullett,
By
Pierce, Scheffler & Parker
his Attorneys United States Patent Office 2,920,020
Patented Jan. 5, 1960

2,920,020

PRODUCING COMPOSITIONS OF MOLTEN SALTS COMPOSED ESSENTIALLY OF ALKALINOUS METAL CHLORIDES AND SOLUBLE TITANIUM CHLORIDES

William W. Gullett, College Park, Md., assignor to Chicago Development Corporation, Riverdale, Md., a corporation of Delaware Application April 10, 1956, Serial No. 577,227

2 Claims. (Cl. 204—64)

This invention relates to compositions of molten salts suitable for use as electrolytes in the refining of titanium. It relates in particular to methods of producing such compositions, in a highly reduced state, composed essentially of alkalinous metal chlorides or bromides containing soluble titanium chlorides.

In my copending application executed and mailed March 22, 1956, Serial No. 573,336, now Patent No. 2,817,631, I have disclosed the advantages of a completely reduced electrolyte composed of at least one fused alkalinous chloride or bromide and titanium chloride or bromide. By a completely reduced electrolyte of this character I mean to specify that the hydrogen evolution when the electrolyte is placed in dilute acid corresponds to at least one mol for every 2 mols of soluble titanium. Any additional hydrogen corresponds to either dissolved alkalinous metal, a sub-chloride of titanium or a pyrosol of alkalinous metal. My present invention relates particularly to the production of initial and make-up electrolyte for the process of my copending application. It relates also to the production of titanium chlorides or bromides dissolved in fused alkalinous chlorides or bromides for other procedures for electrorefining titanium or for other purposes.

In the known art alkalinous metals have been reacted with titanium tetrachloride to produce mixtures of alkalinous chloride and lower titanium chlorides. The product of such a reaction depends on the temperature which it is carried out. At low temperatures the alkalinous metal chloride produced is solid and impedes the reaction. At high temperatures much metallic titanium is formed.

The nature of the fused baths which I prepare particularly for use in my copending application previously referred to, will be more fully understood by reference to the drawing. In Figure 1 of the drawing is shown a conventional ternary diagram for the three components of the fused bath which I prepare, titanium, halogen and alkalinous metal. The term component in this diagram has the usual phase rule definition. The composition of the electrolytes of my invention lie along the line X—Y in the ternary diagram. It will be seen that these electrolytes may be regarded as a binary system made up of $TiH_2$ and alkalinous metal chloride containing alkalinous metal. The amount of alkalinous metal in excess of the stoichiometric relationship is enough to saturate the melt slightly above its freezing point. This varies with the alkalinous metal. With the alkaline earth metals, calcium, barium, and strontium, this may be as much as 20% by weight of the dissolved alkalinous halide. With sodium, potassium, and lithium it is substantially below 5%, while with magnesium it is very small, so that magnesium is not preferred for the alkalinous metal in my invention.

In Figure 2 I have shown a section of the ternary diagram along the line X—Y in which temperature is plotted vertically in the conventional manner. It will be seen that only in the temperature-composition zone E a stable molten electrolyte containing titanium with a mean valence of two or less can be formed. By the mean valence of the titanium I mean to express total reducing power of the electrolyte. This may be most conveniently determined by dissolving the solid electrolyte in ferric sulphate solution and measuring hydrogen evolution and reduction of the ferric sulphate. These two parameters taken together give the total reducing power which may be arbitrarily referred to as the valence of the titanium. The reducing power is the sum of the reducing power of lower titanium halide and alkalinous metal.

My invention, as will be fully illustrated hereinafter, encompasses making baths of composition range E directly by reduction of titanium tetrahalide with a solution of alkalinous metal in fused alkalinous metal halide. In another, and preferred, embodiment of my invention I prepare mixtures of lower halides of titanium, alkalinous metal halides, and alkalinous metal, and add these to the molten alkalinous metal halide to produce a bath with the composition range E on the diagram Figure 2.

For example I combine sodium and titanium tetrachloride so as to produce a molten mixture represented by A on Figure 2. This mixture melts at 485° C. so that the titanium is mostly present as $TiCl_2$. If this mixture is directly heated with sodium chloride to give a composition within the area E, which in this instance is below 5% total titanium as chloride, the $TiCl_2$ will disproportionate to form $TiCl_3$ and Ti. However, if it is added to molten NaCl according to my procedure, there will be substantially no disproportionation.

It is possible to prepare mixtures of $MH_n$, $TiH_2$, and M at lower temperatures such as represented by the point B, but it is mechanically much more difficult to obtain complete reaction However, the partially reacted mixture may be added directly to molten alkalinous metal halide with satisfactory results.

I have found that the reaction can be carried out effectively in a low melting mixture of chlorides. This mixture may be most conveniently titanium dichloride and the chloride of the alkalinous metal used for reduction. Titanium dichloride forms eutectic mixtures at about 50 wt. percent dichloride with the alkalinous chlorides which melt at 400–550° C. Such mixtures are preferred for my invention, which consists in adding titanium tetrachloride and alkalinous metal simultaneously in the proportions to form titanium dichloride to such a low melting salt mixture. At the end of the operation either tetrachloride or alkalinous metal is added to produce the desired degree of reduction as determined by hydrogen evolution. By my procedure at least 95% of the titanium is recovered as lower chloride mixed with alkalinous metal chloride.

The same procedure may be used for the production of mixtures of alkalinous bromide and lower titanium bromide from alkalinous metal and titanium tetrabromide. If titanium dichloride is not available as a starting constituent, I use the eutectic mixture of lithium and potassium chloride, which becomes attentuated in concentration as the operation proceeds, and in each succeeding batch I use some of the product of a previous batch so that eventually the percent of lithium and potassium chloride is negligible. Other low melting mixtures of alkalinous halides may be used as starting mixtures. For example, a mixture of sodium and potassium bromide may be used, the small admixture of alkaline bromide being without adverse effect. I can also use titanium tetrabromide in place of the chloride and obtain the equivalent bromide systems which are suitable for my invention. In all of these procedures for making lower titanium halides the reaction is with alkalinous metal dissolved in fused alkalinous metal halide.

In a preferred embodiment of my invention I use sodium as the alkalinous metal, and by starting with the eutectic of sodium chloride and titanium dichloride melting at 487° C., I carry out the reaction below 500° C. At completion I determine the degree of reduction by hydrogen evolution and add either sodium or $TiCl_4$. For purposes of the invention disclosed in my copending application previously referred to I add sodium to give at least 10% excess hydrogen evolution over that calculated for titanium dichloride. The product of such a reaction contains about 20% soluble titanium. It cannot be heated to a temperature where it is fully melted without disproportionation to form titanium metal and $TiCl_3$. Since the electrolyte for use according to my copending application previously referred to contains preferably 3–5% soluble titanium, I prepare it by fusing the alkalinous chloride, e.g., sodium chloride or sodium chloride and barium chloride, and add the reaction product containing 20% soluble titanium. In this way stable fused baths can be made containing 3–5% soluble titanium without loss due to disproportionation. The electrolytes prepared in this way may be directly used, but if it is desired to obtain a uniform clear salt, the fused bath must be rapidly cooled from the molten state.

In order to describe more fully the invention, the following examples are presented:

*Example I*

I use a closed iron vessel to produce the mixture of fused alkalinous chloride and titanium chloride. I add 450 grams of lithium chloride and 550 grams of potassium chloride and then seal the vessel with a superstructure which consists of a condenser and valves for introducing sodium and $TiCl_4$. I heat the vessel to melt the mixture of lithium and potassium chlorides and then adjust the temperature to 487° C. I then add 4.6 grams of sodium metal and 19 grams of titanium tetrachloride and allow them to react, during refluxing of the tetrachloride. I repeat this operation until I have added 190 grams of titanium tetrachloride and 46 grams of sodium. The reaction temperature was not allowed to go above 500° C. I then remove a sample of the reacted material and analyze it by hydrogen evolution. The amount of gas evolved shows that the material was not reduced all the way to titanium dichloride so I add 3 grams of sodium and allow the mixture to further react. I then allow the reaction mixture to cool and remove the solidified product from the vessel. Analysis shows he final product to be 4.8% titanium as chloride whose apparent titanium valence is 2.04. There is substantially no titanium metal present.

*Example II*

In this example I proceed as in Example I except that at the ned of the operation I add 6 grams of sodium. The resulting product showed hydrogen evolution corresponding to a valence of 1.90 for the titanium.

*Example III*

In this example I followed the procedure of Example I except that I maintain the mixture of lithium and potassium chloride at 510° C. and do not allow the reaction temperature to go above 550° C. at any time. Analysis of the product shows it to be 4.8% titanium chloride whose apparent titanium valence is 1.98.

*Example IV*

In this example I followed the procedure of Example I except that I use lithium and potassium bromides in place of the lithium and potassium chlorides. The bromide mixture is maintained at 450° C. and the reaction temperature not allowed to exceed 500° C.

*Example V*

In this example I take an iron vessel as in Example I to which I add 400 grams of lithium bromide and 550 grams of potassium bromide. I heat the vessel to melt this mixture together and then maintain the temperature at 400° C. I then add 380 grams of titanium tetrabromide and 46 grams of sodium metal and allow them to react during refluxing of the $TiBr_4$. The reaction temperature is not allowed to exceed 450° C. I then remove a sample of the reacted material and analyze it by hydrogen evolution. I find that there is excess hydrogen evolved over that which should be evolved if the resultant titanium dibromide had an apparent titanium valence of 2.00. I therefore add 8 grams of titanium tetrabromide and allow the mixture to further react. I then allow the reaction mixture to cool and remove the solidified product from the vessel. Analysis shows the final product to be 4.1% titanium as bromide whose apparent titanium valence is 2.06. There is substantially no titanium metal present.

*Example VI*

In this example I follow the procedure of Example I except that I use no carrier alkalinous halide salt. I add only titanium tetrachloride and sodium metal in small stoichiometric amounts at a temperature not to exceed 500° C.

*Example VI-A*

In this example I take an iron vessel as in Example I, which I heat to 500° C. I then add 15.0 grams of titanium tetrabromide and then 3.0 grams of sodium metal and allow them to react during refluxing of the titanium tetrabromide. I then add titanium tetrachloride and sodium metal in stoichiometric amounts until a total of 378.0 grams of titanium and 90.5 grams of sodium has been reacted. I then remove a sample of reacted material and analyze by hydrogen evolution. I find that the reaction is not complete. I then add 5 grams of sodium and allow the material to react completely by refluxing for 1 hour. I then allow the reaction to cool and I remove solidified material from vessel. Analysis shows the final product to be 20% titanium as chloride and bromide with apparent valence of 1.98. There is substantially no titanium metal present.

*Example VII*

In this example I prepare an electrolyte suitable for the electrofining of titanium alloys in accordance with the procedure of my copending application executed and mailed March 22, 1956.

I combine sodium and titanium tetrachloride by the gradual addition of sodium to a reaction vessel at 450° C. I add $TiCl_4$ to this vessel and permit to reflux until it has combined with each sodium addition. I add in this way 378 grams of $TiCl_4$ and 95 grams of sodium. The resulting product when cooled and removed from the reaction vessel is a mixture of $TiCl_2$, $TiCl_3$ and NaCl. I find that this mixture contains 18.2% soluble titanium as chloride and about 5% metallic titanium. The Ti is about 75% present as $TiCl_2$. I now melt 2400 grams of NaCl at 850° C. in an argon atmosphere and add the 473 grams of my reaction product. The resulting salt analyzes 3.2% soluble titanium as chloride. I take this melt in an argon atmosphere and electrolyze it with two titanium electrodes and a periodically reversed direct current, the current density on both electrodes it 2000 amperes/sq. ft. I find that after passing 24 ampere hours of current the salt analyses 4.0% soluble titanium with a mean valence of 2.01. This product is a suitable electrolyte for my process.

*Example VIII*

In this example I proceed as in Example VII except that I add the reaction mixture to a molten bath of 80% NaCl—20% $BaCl_2$ to which has been added an amount of sodium to reduce the titanium to a mean valence of 1.90. I do not use the electrolytic step in this example.

Example IX

In this example I proceed as in Example VII except that I take the product of the initial reaction and add it in small portions to molten sodium chloride to which sodium is added from time to time. The amount of sodium is that necessary to reduce the titanium to a mean valence of 1.85. The resulting product contains titanium with a mean valence of 1.92 and is a suitable electrtolyte for the invention of my copending application.

Example X

In this example I combine sodium with titanium tetrachloride by reacting at 180° C. I do this by refluxing titanium tetrachloride over sodium which is triturated so as to continuously expose unreacted sodium. I do this in an iron vessel provided with an argon atmosphere. The product is granular and analyzes 14.2% titanium as chloride and 2% free sodium finely distributed through the mass. I add this product to molten sodium chloride so as to produce a bath containing 4% titanium as soluble chloride. The mean valence of tantanium as chloride is 1.93.

Example XI

In this example I use an electrolytic cell provided with a porous diaphragm and an electrolyte of 70% NaCl and 30% $BaCl_2$. The catholyte contains 2000 grams, the anolyte 500 grams. In the anolyte compartment I place a graphite anode and in the cathode compartment a steel cathode. The temperature of the electrolyte is 850° C., and the cell and its contents are protected with an inert gas. I pass a unidirectional current through the cell at 500 amperes/sq. ft. anode current density and 2000 amperes/sq. ft. cathode current density. Chlorine is evolved at the anode and is conducted from the cell. The catholyte dissolves barium, and after passing 108 ampere hours, contains 4 equivalents of barium. I pass into the catholyte 2 mols of $TiCl_4$ and obtain two mols of $TiCl_2$ dissolved in the catholyte corresponding to about 5% Ti as chloride. The mean valence of titanium is 1.94.

Example XII

In this example I proceed as in Example X except that I use metallic calcium in place of sodium. Since the calcium is solid, more effective trituration is necessary, and I use a closed iron rod mill provided with argon atmosphere and attached condenser and inlet for $TiCl_4$. The product is granular and contains 12.8% titanium as chloride and 2% metallic calcium.

The product is well suited for addition to fused calcium chloride to prepare the electrolyte of my invention.

I claim:

1. Method of producing a salt composition, which is entirely molten at 800°–900° C. and which consists essentially of sodium chloride and from about 1 to about 5% by weight of soluble titanium as chloride having an average valence of 1.85–2.05 as determined by hydrogen evolution, which consists essentially in reacting sodium and titanium tetrachloride in small increments, in an inert atmosphere in a vessel provided with a reflux condenser, at a temperature of from about 400° to about 600° C., the reactants being brought together in the proportion of $TiCl_4+2Na$, to produce a reaction product containing from about 17 to about 20% soluble titanium, and adding said reaction product, out of access to air, to a proportionate amount of molten sodium chloride to produce a salt composition containing from about 1 to about 5% soluble titanium.

2. Method of producing a salt composition, which is entirely molten at 800°–900° C. and which consists essentially of sodium chloride, at least one other alkalinous metal chloride, and from about 1 to about 5% by weight of soluble titanium as chloride having an average valence of 1.85–2.05 as determined by hydrogen evolution, which consists essentially in reacting sodium and titanium tetrachloride in small increments, in an inert atmosphere in a vessel provided with a reflux condenser, at a temperature of from about 400° to about 600° C., the reactants being brought together in the proportion of $TiCl_4$ to $2Na$, to produce a reaction product containing from about 17 to about 20% soluble titanium, and adding said reaction product, out of access to air, to a proportionate amount of a molten salt mixture consisting essentially of said other alkalinous metal chloride and sodium chloride to produce a salt composition containing from about 1 to about 5% soluble titanium.

References Cited in the file of this patent

UNITED STATES PATENTS

| | | |
|---|---|---|
| 2,607,674 | Winter | Aug. 19, 1952 |
| 2,765,270 | Brenner et al. | Oct. 2, 1956 |
| 2,817,631 | Gullett | Dec. 24, 1957 |

FOREIGN PATENTS

| | | |
|---|---|---|
| 682,919 | Great Britain | Nov. 19, 1952 |

OTHER REFERENCES

Journal of Metals, September 1956, pages 1167 and 1168.